US008553645B2

(12) United States Patent
Kuchibhotla et al.

(10) Patent No.: US 8,553,645 B2
(45) Date of Patent: Oct. 8, 2013

(54) METHOD AND APPARATUS FOR SERVICE CONTINUITY ON A MOBILE COMMUNICATION DEVICE

(75) Inventors: Ravi Kuchibhotla, Gurnee, IL (US); Michael Eoin Buckley, Grayslake, IL (US); Padmaja Putcha, Gurnee, IL (US)

(73) Assignee: Motorola Mobility LLC, Libertyville, IL (US)

( * ) Notice: Subject to any disclaimer, the term of this patent is extended or adjusted under 35 U.S.C. 154(b) by 724 days.

(21) Appl. No.: 12/533,215

(22) Filed: Jul. 31, 2009

(65) Prior Publication Data

US 2011/0026450 A1  Feb. 3, 2011

(51) Int. Cl.
*H04W 36/00* (2009.01)
*H04W 4/00* (2009.01)

(52) U.S. Cl.
USPC .......................................... 370/331; 455/436

(58) Field of Classification Search
USPC .......................................................... 370/331
See application file for complete search history.

(56) References Cited

U.S. PATENT DOCUMENTS

| | | | |
|---|---|---|---|
| 2006/0274712 A1 | 12/2006 | Malladi et al. | |
| 2007/0097914 A1 | 5/2007 | Grilli et al. | |
| 2007/0223703 A1 | 9/2007 | Verma et al. | |
| 2008/0192675 A1 | 8/2008 | Kim et al. | |
| 2008/0268878 A1* | 10/2008 | Wang et al. | 455/458 |
| 2009/0274120 A1* | 11/2009 | Chou | 370/331 |
| 2010/0208674 A1* | 8/2010 | Lee et al. | 370/329 |
| 2011/0013554 A1* | 1/2011 | Koskinen | 370/315 |
| 2011/0149907 A1* | 6/2011 | Olsson et al. | 370/331 |

FOREIGN PATENT DOCUMENTS

EP   1467584 A1   10/2004

OTHER PUBLICATIONS

Patent Cooperation Treaty, "PCT Search Report and Written Opinion of the International Searching Authority" for International Application No. PCT/US2010/040166 Oct. 28, 2010, 17 pages.
3GPP TSG RAN2 #56, Tdoc R2-063326 "Smart scheduling for dual receiver UEs" Riga, Latvia, Nov. 6-10, 2006, 6 pages.
3GPP TSG RAN WG4 #42, R4-070345 "UE Capability Considerations" Nokia, Sophia Antipolis, France, Apr. 2-4, 2007, 4 pages.
3GPP TSG RAN WG2 #56, R2-063066 "UE Capability for Dedicated Carrier MBMS and Unicast Reception" Nokia, NTT DoCoMo, Riga, Latvia, Nov. 6-10, 2006, 8 pages.
3GPP TS 36.300 V8.9.0 (Jun. 2009) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 90 pages.

(Continued)

*Primary Examiner* — Shaq Taha

(57) ABSTRACT

A method and apparatus for service continuity on a mobile communication device is disclosed. The method can include receiving (320) a first service on a first carrier, where the first service can have a multicast subframe allocation pattern. The method can include establishing (340) a connection on a second carrier on a universal mobile telecommunication system. The method can include informing (350) a source of the second carrier of the multicast subframe allocation pattern of the first service. The method can include receiving (360) scheduling grants for subframes on the second carrier. The subframes corresponding to the received scheduling grants can be distinct from subframes corresponding to the multicast subframe allocation pattern of the first service. The method can include receiving (370) a second service on the second carrier based on the scheduling grants while receiving the first service on the first carrier.

18 Claims, 3 Drawing Sheets

(56) References Cited

OTHER PUBLICATIONS

3GPP TSG RAN WG2 #56, R2-063240 "Paging a single receiver UE for MBMS Dedicated Layer" LG Electronics Inc., Riga, Latvia, Nov. 6-10, 2006, 6 pages.

Jim Tomcik; MBFDD and MBTDD Wideband Mode: Technology Overview; IEEE 802.20 Working Group on Mobile Broadband Wireless Access; Jan. 6, 2006.

China Mobile, Vodafone, Qualcomm, ZTE; Option for Uplink Messaging in LTE MBMS; 3GPP TSG RAN WG2 Meeting #60-bis Jan. 14-18, 2008; Seville, Spain.

* cited by examiner

METHOD AND APPARATUS FOR SERVICE CONTINUITY ON A MOBILE COMMUNICATION DEVICE

BACKGROUND

1. Field

The present disclosure is directed to a method and apparatus for service continuity on a mobile communication device. More particularly, the present disclosure is directed to service continuity on a mobile communication device in an evolved universal mobile telecommunication system terrestrial radio access system.

2. Introduction

Presently, wireless terminals, such as cellular phones, can receive multimedia broadcast multicast service sessions where multimedia data, such as video, is broadcast to multiple terminals. Unfortunately, a base station serving a wireless terminal may not know the wireless terminal is receiving a multimedia broadcast multicast service session when the base station pages the wireless terminal to put it into a voice call. For example, a wireless terminal can receive multimedia broadcast multicast services while it is in idle mode. However, any services received by the wireless terminal are unknown to the serving base station since the base station does not monitor services being received while the wireless terminal is in idle mode. This can cause discontinuity in the services provided to the wireless terminal. This also causes a problem for ensuring simultaneous reception of voice calls and multimedia broadcast multicast services.

As a further example, an evolved universal mobile telecommunication system terrestrial radio access system operates on a time-frequency domain resource based physical layer. The wireless terminal can receive a pre-configured resource pattern for dedicated services, or it may need to track a particular multicast subframe allocation pattern for a multimedia broadcast multicast service, even in idle mode. A multicast subframe allocation pattern is a pattern of subframes assigned to the service of interest to the wireless terminal. This pre-configured resource pattern either in the dedicated or multicast case defines the resources the wireless terminal needs to receive and decode. Unfortunately, the wireless terminal cannot receive multiple services simultaneously with continuity of both services.

Thus there is a need for a method and apparatus for service continuity on a mobile communication device.

SUMMARY

A method and apparatus for service continuity on a mobile communication device is disclosed. The method can include receiving a first service on a first carrier, where the first service can have a multicast subframe allocation pattern. The method can include establishing a connection on a second carrier on a universal mobile telecommunication system. The method can include informing a source of the second carrier of the multicast subframe allocation pattern of the first service. The method can include receiving scheduling grants for subframes on the second carrier. The subframes corresponding to the received scheduling grants can be distinct from subframes corresponding to the multicast subframe allocation pattern of the first service. The method can include receiving a second service on the second carrier based on the scheduling grants while receiving the first service on the first carrier.

BRIEF DESCRIPTION OF THE DRAWINGS

In order to describe the manner in which advantages and features of the disclosure can be obtained, a more particular description of the disclosure briefly described above will be rendered by reference to specific embodiments thereof, which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
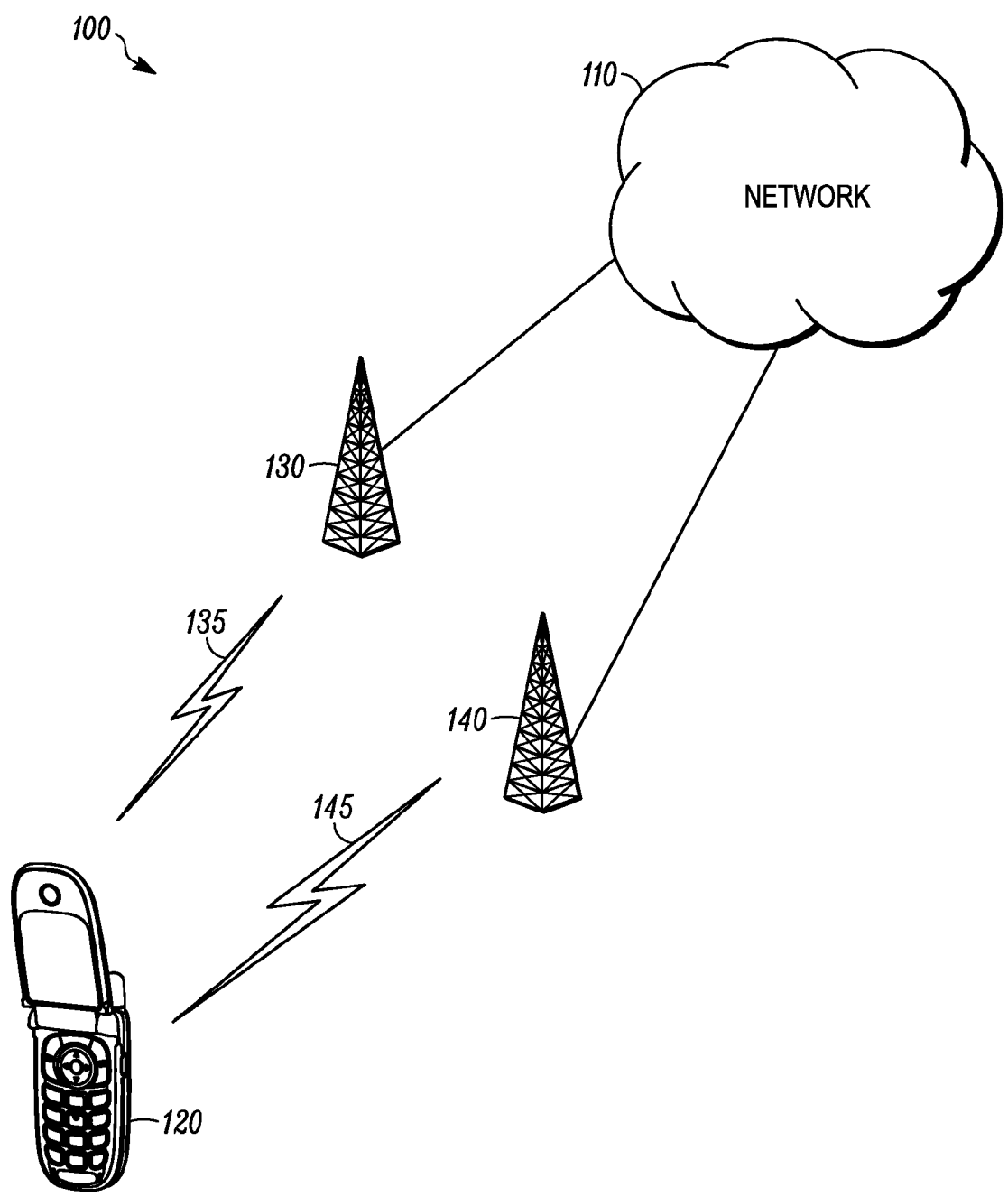
FIG. 1 illustrates an exemplary block diagram of a system in accordance with a possible embodiment.

FIG. 1 is an exemplary block diagram of a system 100 according to a possible embodiment. The system 100 can include a network 110, a terminal 120, and base stations 130 and 140. The terminal 120 may be a wireless communication device, such as a wireless telephone, a wireless terminal, a cellular telephone, a personal digital assistant, a pager, a personal computer, a selective call receiver, or any other device that is capable of sending and receiving communication signals on a network including a wireless network.

The network 110 may include any type of network that is capable of sending and receiving signals, such as wireless signals. For example, the network 110 may include a wireless telecommunications network, a cellular telephone network, a time division multiple access network, a code division multiple access network, a satellite communications network, an evolved universal mobile telecommunication system terrestrial radio access network, and other like communications systems.

In operation, the terminal 120 can receive a multicast service on a first carrier 135. The first carrier can be associated with the base station 130. The multicast service can have a multicast subframe allocation pattern including a pattern of sub-frames assigned to the multicast service. The terminal 120 can establish a connection on a second carrier 145 on an evolved universal mobile telecommunication system terrestrial radio access system. The terminal 120 can establish the connection on the second carrier 145 before or after receiving the multicast service on the first carrier 135. The second carrier 145 can be associated with the base station 130 or can be from a second base station 140. The terminal 120 can inform a source of the second carrier 145 of the multicast subframe allocation pattern of the multicast service. The terminal 120 can receive scheduling grants for subframes with respect to the second carrier 145. The subframes corresponding to the received scheduling grants with respect to the second carrier 145 can be distinct from subframes corresponding to the multicast subframe allocation pattern of the multicast service. The terminal 120 can receive a second service on the second carrier 145 based on the scheduling grants while receiving the multicast service on the first carrier 135.

The multicast subframe allocation pattern of the first service can have a subframe of 1 ms in a frame of 10 ms. Certain subframes can be allocable to multicast/broadcast data transmissions. The terminal 120 can operate in an idle mode where it is not in a connected mode voice call and where it is listening for paging information. The terminal 120 can receive the first service by receiving a multimedia broadcast multicast service session while in idle mode where a subset of allocable subframes have been assigned by the network 110 to the multimedia broadcast multicast service session that the terminal 120 is receiving. This subset can be common to all of the terminals receiving the multimedia broadcast multicast service session.

For example, the terminal 120 can inform the second carrier 145 of the identity of a first service it is currently receiving on the first carrier 135, and it can provide the identity of the multicast subframe allocation pattern associated with the first service being received on the first carrier 135. A scheduling entity associated with the second carrier 145 can utilize this information to provide uplink scheduling grants and downlink assignments to the terminal 120 in order to allow the terminal 120 to receive a second service on the second carrier 145. The terminal 120 may further be tasked with monitoring paging on the second carrier 145.

The identity of the multicast subframe allocation pattern can be provided in the, for example, RRC CONNECTION ESTABLISHMENT COMPLETE message from the terminal 120 to the base station 130. The service identity can also be provided from the terminal 120 to the base station 130. The method can allow long term evolution evolved universal mobile telecommunication system terrestrial radio access systems and other systems to support multiple services on different carriers without redirecting the service to another carrier.

Figure 2:
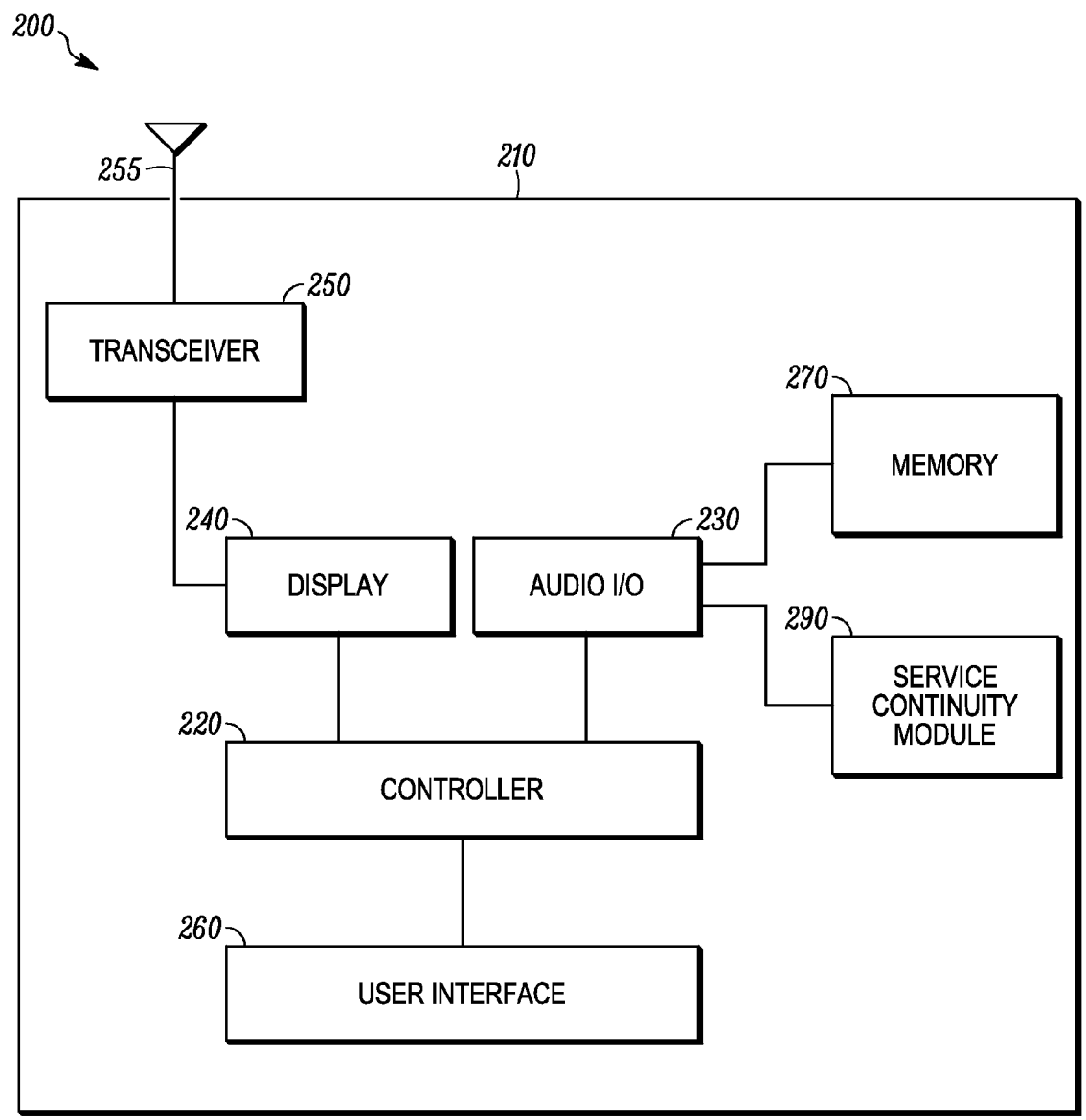
FIG. 2 illustrates an exemplary block diagram of a wireless communication device in accordance with a possible embodiment.

FIG. 2 is an exemplary block diagram of a wireless communication device 200, such as the terminal 120, according to a possible embodiment. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, an antenna 255 coupled to the transceiver 250, a user interface 260 coupled to the housing 210, and a memory 270 coupled to the housing 210. The wireless communication device 200 can also include a service continuity module 290. The service continuity module 290 can be coupled to the controller 220, can reside within the controller 220, can reside within the memory 270, can be an autonomous module, can be software, can be hardware, or can be in any other format useful for a module on the wireless communication device 200.

The display 240 can be a liquid crystal display (LCD), a light emitting diode (LED) display, a plasma display, or any other means for displaying information. The transceiver 250 may include a transmitter and/or a receiver and may include more than one transceiver. The audio input and output circuitry 230 can include a microphone, a speaker, a transducer, or any other audio input and output circuitry. The user interface 260 can include a keypad, buttons, a touch pad, a joystick, an additional display, a touch screen display, or any other device useful for providing an interface between a user and an electronic device. The memory 270 may include a random access memory, a read only memory, an optical memory, a subscriber identity module memory, or any other memory that can be coupled to the wireless communication device 200.

In operation, the transceiver 250 can be configured to receive a first service on a first carrier, where the first service can have a multicast subframe allocation pattern. The controller 220 can be configured to control operations of the wireless communication device 200. The controller 220 can also be configured to establish, via a second transceiver in the transceiver 250, a connection on a second carrier on a universal mobile telecommunication system. The service continuity module 290 can be configured to inform, either via the second transceiver or via a first transceiver in the transceiver 250, a source of the second carrier of the multicast subframe allocation pattern of the first service. The second transceiver in the transceiver 250 can be configured to receive scheduling grants for subframes with respect to the second carrier. The subframes corresponding to the received scheduling grants can be distinct from subframes corresponding to the multicast subframe allocation pattern of the first service. The transceiver 250 can also be configured to receive a second service on the second carrier based on the scheduling grants while receiving the first service on the first carrier. The first and second carrier may be adjacent carriers in the same band in which case a single transceiver 250, may be sufficient to receive both first and second carriers and perform other operations without the second transceiver 350.

The first service can be a multicast service and the second service comprises a unicast service. The multicast subframe allocation pattern can be a pattern of sub-frames assigned to the first service. The multicast subframe allocation pattern can include a transmission gap pattern with respect to the first service, where the transmission gap pattern can indicate gaps in a transmission pattern with the first carrier during which the wireless communication device 200 cannot be scheduled a service on the second carrier.

The transceiver 250 can be configured to monitor paging on the second carrier while receiving the first service on the first carrier. The transceiver 250 can also be configured to monitor paging on the first carrier for a service on a different carrier while receiving the first service on the first carrier.

The service continuity module 290 can be configured to inform, via the transceiver 250, in a radio resource control connection establishment complete message, a source of the second carrier of the multicast subframe allocation pattern of the first service. The service continuity module 290 can also be configured to inform the source of the second carrier of the multicast subframe allocation pattern by informing, via the transceiver 250, a source of the second carrier of a service identity of the first carrier. The controller 220 can be configured to establish a connection on a second carrier by establishing, via the second transceiver, a connection on a second carrier on a universal mobile telecommunication system before receiving the first service on the first carrier.

Figure 3:
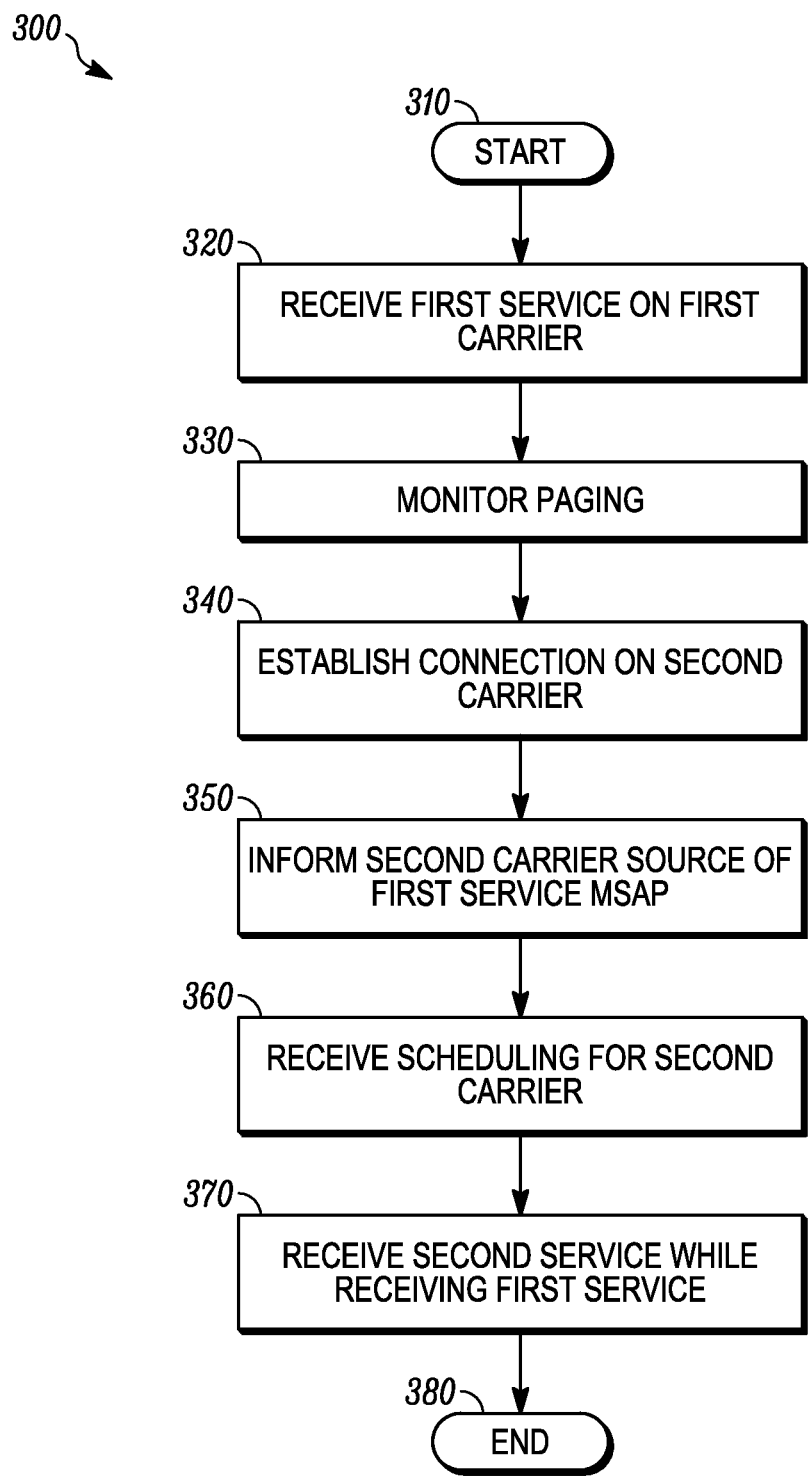
FIG. 3 is an exemplary flowchart illustrating the operation of a wireless communication device in accordance with a possible embodiment.

FIG. 3 is an exemplary flowchart 300 illustrating the operation of the wireless communication device 200 according to a possible embodiment. At 310, the flowchart begins. At 320, a first service can be received on a first carrier. The first service can have a multicast subframe allocation pattern. The multicast subframe allocation pattern can include a pattern of subframes assigned to the first service. This multicast subframe allocation pattern pre-configured resource pattern, either in a dedicated or a multicast case, can define resources the wireless communication device 200 needs to receive and decode. The multicast subframe allocation pattern can include a transmission gap pattern with respect to the first service, where the transmission gap pattern can indicate gaps in a transmission pattern with the first carrier during which the wireless terminal cannot be scheduled a service on the second carrier. The transmission gap pattern can include a measurement gap pattern configured by a base station for neighbor cell measurements.

At 330, paging on the first carrier can be monitored for service on a different carrier while receiving the first service on the first carrier. Also, paging on a second carrier can be monitored while receiving the first service on the first carrier. In general the wireless communication device 200 may be configured to monitor paging on a third carrier distinct from the first and second carriers. At 340, a connection can be established on a second carrier on a universal mobile telecommunication system. The second carrier can be from the same base station as the first carrier, or the carriers can be from different base stations. The universal mobile telecommunication system can be an evolved universal mobile telecommunication system terrestrial radio access system. The connection on the second carrier can be established on a universal mobile telecommunication system before receiving the first service on the first carrier. For example, the connection can be established on the second carrier before or after the first service is received on the first carrier.

At 350, a source of the second carrier can be informed of the multicast subframe allocation pattern of the first service. The source of the second carrier can be informed, in a radio resource control connection establishment complete message, of the multicast subframe allocation pattern of the first service. The source of the second carrier can be informed of a service identity of the first carrier.

At 360, scheduling grants for subframes on the second carrier can be received. The subframes corresponding to the received scheduling grants can be distinct from subframes corresponding to the multicast subframe allocation pattern of the first service. At 370, a second service can be received on the second carrier based on the scheduling grants while receiving the first service on the first carrier. The first service can be a multicast service and the second service can be a unicast service. At 380, the flowchart 300 can end.

Embodiments can provide a method and apparatus that permits a resource allocation pattern to be coordinated in a network to allow a wireless terminal to receive multiple services simultaneously. The wireless terminal can inform a second carrier the identity of a first service it is currently receiving on a first carrier and the wireless terminal can provide the identity of a multicast subframe allocation pattern associated with the first service being received on the first carrier. For example, embodiments can provide for scheduling of unicast service on a second carrier while receiving a multimedia broadcast multicast service on a first carrier.

The identity of the multicast subframe allocation pattern can be provided in a Radio Resource Control (RRC) Connection Establishment Complete message to a base station. The service identity of the multimedia broadcast multicast service can also be provided to the base station.

The wireless terminal can provide information to the base station of the multicast subframe allocation pattern it is tracking so that the base station can avoid scheduling the wireless terminal during the multicast subframe allocation pattern scheduled occasions when the base station schedules the wireless terminal for unicast data. Based on this information, the base station can also avoid scheduling the wireless terminal in immediately adjacent subframes as well, in order to allow the wireless terminal to switch from one carrier to another. Also, a page message itself can be transmitted through the second carrier and multimedia broadcast multicast service data can be sent on the unicast second carrier along with unicast data.

The methods of this disclosure may be implemented on a programmed processor. However, the operations of the embodiments may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the operations of the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method in a wireless terminal comprising:
  receiving a first service on a first carrier, the first service having a multicast subframe allocation pattern;
  establishing a connection on a second carrier on a universal mobile telecommunication system while receiving the first service;
  informing a source of the second carrier of the multicast subframe allocation pattern of the first service;
  receiving scheduling grants for subframes on the second carrier, the subframes corresponding to the received scheduling grants being distinct from subframes corresponding to the multicast subframe allocation pattern of the first service; and
  receiving a second service on the second carrier based on the scheduling grants while receiving the first service on the first carrier,
  wherein the multicast subframe allocation pattern includes a transmission gap pattern with respect to the first service, the transmission gap pattern indicating gaps in a transmission pattern with the first carrier during which the wireless terminal cannot be scheduled a service on the second carrier.

2. The method according to claim 1, wherein the first service comprises a multicast service and the second service comprises a unicast service.

3. The method according to claim 1, wherein the multicast subframe allocation pattern comprises a pattern of subframes assigned to the first service.

4. The method according to claim 1, further comprising monitoring paging on the first carrier for service on a different carrier while receiving the first service on the first carrier.

5. The method according to claim 1, further comprising monitoring paging on the second carrier while receiving the first service on the first carrier.

6. The method according to claim 1, wherein the universal mobile telecommunication system comprises an evolved universal mobile telecommunication system terrestrial radio access system.

7. The method according to claim 1, wherein informing a source of the second carrier of the multicast subframe allocation pattern comprises informing, in a radio resource control connection establishment complete message, a source of the second carrier of the multicast subframe allocation pattern of the first service.

8. The method according to claim 1, wherein establishing the connection on the second carrier comprises establishing the connection on the second carrier on a universal mobile telecommunication system before receiving the first service on the first carrier.

9. The method according to claim 1, wherein informing the source of the second carrier further comprises informing the source of the second carrier of a service identity of the first carrier.

10. An apparatus comprising:
a wireless communication device housing;
a transceiver coupled to the wireless communication device housing, the transceiver configured to receive a first service on a first carrier, the first service having a multicast subframe allocation pattern; and
a controller coupled to the transceiver, the controller configured to control operations of the apparatus and configured to establish, via the transceiver, a connection on a second carrier on a universal mobile telecommunication system while receiving the first service, and configured to inform, via the transceiver, a source of the second carrier, of the multicast subframe allocation pattern of the first service,
wherein the transceiver is configured to receive scheduling grants for subframes with respect to the second carrier, the subframes corresponding to the received scheduling grants being distinct from subframes corresponding to the multicast subframe allocation pattern of the first service,
wherein the transceiver is configured to receive a second service on the second carrier based on the scheduling grants while receiving the first service on the first carrier, and
wherein the multicast subframe allocation pattern includes a transmission gap pattern with respect to the first service, the transmission gap pattern indicating gaps in a transmission pattern with the first carrier during which the apparatus cannot be scheduled a service on the second carrier.

11. The apparatus according to claim 10, wherein the first service comprises a multicast service and the second service comprises a unicast service.

12. The apparatus according to claim 10, wherein the multicast subframe allocation pattern comprises a pattern of subframes assigned to the first service.

13. The apparatus according to claim 10, wherein the transceiver is configured to monitor paging on the second carrier while receiving the first service on the first carrier.

14. The apparatus according to claim 10, wherein the transceiver is configured to monitor paging on the first carrier for a service on a different carrier while receiving the first service on the first carrier.

15. The apparatus according to claim 10, wherein the service continuity module is configured to inform, via the transceiver, in a radio resource control connection establishment complete message, a source of the second carrier of the multicast subframe allocation pattern of the first service.

16. The apparatus according to claim 10, wherein the controller is configured to establish a connection on the second carrier by establishing, via the transceiver, a connection on the second carrier on the universal mobile telecommunication system before receiving the first service on the first carrier.

17. The apparatus according to claim 10, wherein the service continuity module is configured to inform a source of the second carrier of the multicast subframe allocation pattern by informing, via the transceiver, a source of the second carrier of a service identity of the first carrier.

18. A method comprising:
receiving a multicast service on a first carrier, the multicast service having a multicast subframe allocation pattern including a pattern of subframes assigned to the multicast service;
establishing a connection on a second carrier on an evolved universal mobile telecommunication system terrestrial radio access system while receiving the multicast service;
informing a source of the second carrier of the multicast subframe allocation pattern of the multicast service;
receiving scheduling grants for subframes with respect to the second carrier, the subframes corresponding to the received scheduling grants being distinct from subframes corresponding to the multicast subframe allocation pattern of the multicast service; and
receiving a second service on the second carrier based on the scheduling grants while receiving the multicast service on the first carrier,
wherein the multicast subframe allocation pattern includes a transmission gap pattern with respect to the multicast service, the transmission gap pattern indicating gaps in a transmission pattern with the first carrier during which a wireless terminal cannot be scheduled a service on the second carrier.

* * * * *